Nov. 4, 1952     W. P. BENNETT     2,616,204
FISHING REEL SEAT
Filed Oct. 14, 1949
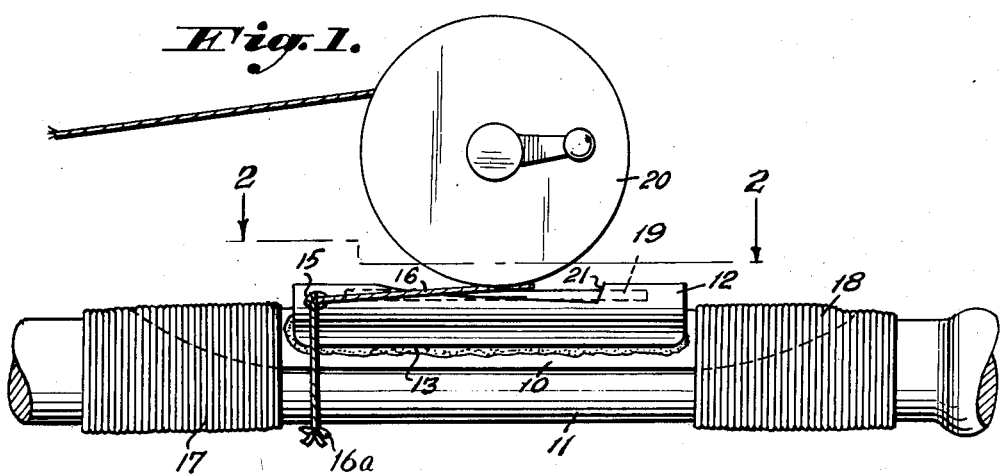
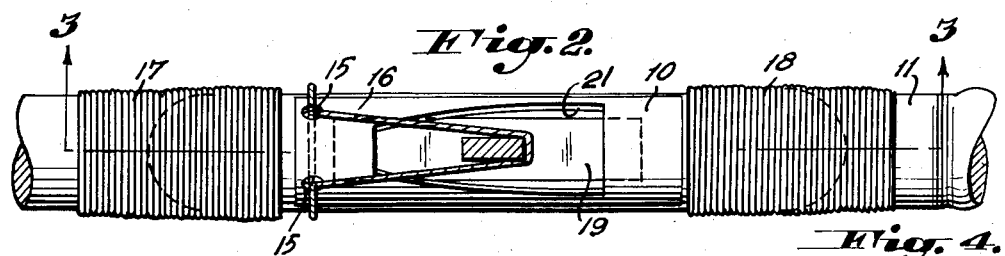
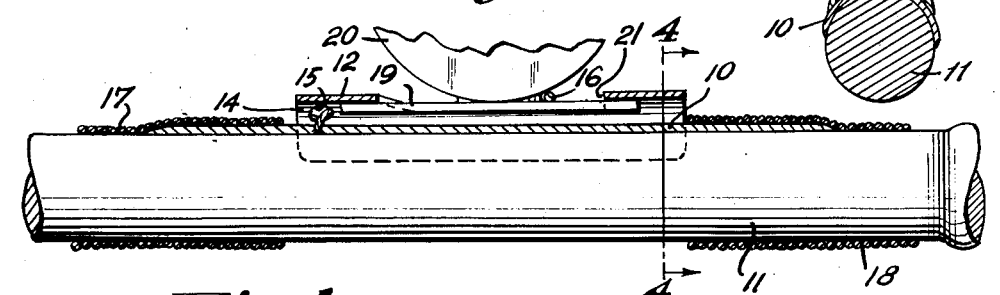
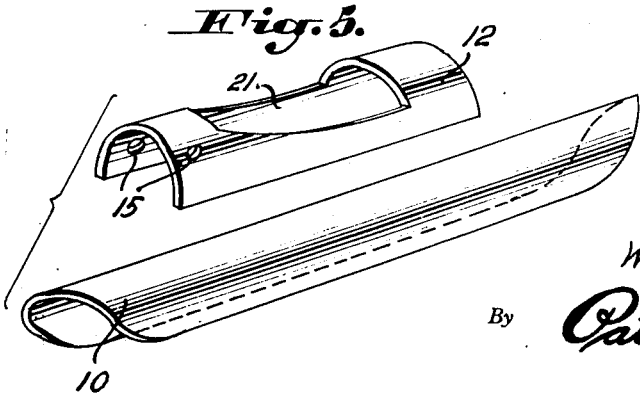
Inventor
Warren P. Bennett
By Patrick D. Beavers
Attorney

Patented Nov. 4, 1952

2,616,204

UNITED STATES PATENT OFFICE 2,616,204

FISHING REEL SEAT

Warren P. Bennett, Boerne, Tex.

Application October 14, 1949, Serial No. 121,421

1 Claim. (Cl. 43—22)

The present invention relates to fishing reel seats and it consists in the combinations, constructions and arrangements of parts herein described and claimed.

Generally there is provided a fishing reel seat which consists of a base member which is arcuate in cross section and which is adapted to fit a preferably solid handle of a fishing pole and to which is affixed a reel locking member which is likewise arcuate in cross sectional area and which is brazed or otherwise attached to the base along its longitudinal edges in spaced relation to the base. The reel locking member is centrally provided with a longitudinal slot for the reception of the base of a reel and is also provided with a pair of openings at its forward end for the reception of a cord which is adapted to be tied around the reel base to doubly insure the same against displacement. The base of the reel seat is secured to the fishing rod handle by means of a wrapping of cord or twine thereover.

It is accordingly an object of the invention to provide a device of the character set forth which is simple in construction, easy to assemble, and yet effective and efficient in use.

Another object of the invention is the provision of novel means for securing a fishing reel seat to a fishing rod handle.

Another object of the invention is the provision of a novel simplified structure in devices of the character set forth.

A still further object of the invention is the provision, in a device of the character set forth, of novel means for locking a fishing reel in a fishing reel seat.

Other and further objects of the invention will become apparent from a reading of the following specification, taken in conjunction with the drawing, in which Figure 1 is a side elevational view of an embodiment of the invention, Figure 2 is a sectional view taken along the line 2—2 of Figure 1, Figure 3 is a sectional view taken along line 3—3 of Figure 2, Figure 4 is a reduced sectional view taken along line 4—4 of Figure 3, and Figure 5 is an exploded perspective view illustrating certain elements of the invention and the manner of their assembly.

Referring more particularly to the drawing, there is shown therein a fishing reel seat composed of an elongated base 10 which is arcuate in cross section and whose concave side fits snugly upon a fishing rod handle 11.

Centrally and longitudinally disposed upon the base 10 is a reel locking member 12 which is likewise arcuate in cross section and whose longitudinal edges are brazed or otherwise affixed to the base 10, as indicated at 13. The member 12 is provided with a smaller arc whereby there is provided a space 14 between the same and the base 10.

Adjacent the forward end of the member 12, there is provided a pair of holes 15 through which a cord 16 is trained and there is also provided a centrally disposed longitudinal slot 21, the forward portions of the side edges of which taper inwardly and forwardly toward each other.

A winding 17 of cord is positioned around the handle 11 and the unencumbered forward portion of the base 10 and a like winding 18 is positioned over the handle 11 and the unencumbered rear portion of the base 10.

In operation, it will be apparent that a reel base 19 of a fishing reel 20 may be inserted into the slot 21 and brought forwardly in the space 14 until the sides of the reel base 19 encounter the forward inwardly tapering edges of the slot 21, after which the cord 16 may be brought around the rear end of the reel at its juncture with its base and the ends of the cord each extended downwardly through one of the openings 15 and upwardly through the other opening 15 and then tied at the side of the handle 11 opposite to that side upon which the base 10 is positioned, as indicated at 16a. The windings 17 and 18 are the sole means utilized for holding the base 10 and its associated parts upon the handle 11, thus eliminating the necessity for using nails, screws or the like. It will be understood that the cord 16 will maintain the reel base in a centered position since it wedges the forward part thereof against the sides of the slot 21 while its rear portion bears against the underside of the plate 12.

While but one form of the invention has been shown and described herein, it will be readily apparent to those skilled in the art that many minor modifications may be made herein without departing from the spirit of the invention or the scope of the appended claim.

What is claimed is:

A fishing reel seat comprising, in combination with a fishing rod and a fishing reel having a reel base of generally rectangular shape, an elongated base plate arcuate in cross sectional area to fit the contour of the handle, an elongated reel locking member likewise arcuate in cross sectional area but having a smaller arc and centrally and longitudinally affixed to the base plate along its longitudinal edges whereby a space is provided between the same and said base, means for holding the base plate in position upon the rod, said reel locking member having a pair of tie-cord receiving openings adjacent the forward edge thereof and a reel base-receiving slot formed centrally therein and said slot having the forward portion of its side edges inwardly and forwardly tapering, and a tie-cord extending around the rear portion of the juncture between said reel and reel base, thence through the tie-cord receiving openings and thence around the fishing rod whereby the reel base is wedged between the tapered sides of the reel base-receiving slot.

WARREN P. BENNETT.

REFERENCES CITED

The following references are of record in the file of this patent:

UNITED STATES PATENTS

| Number | Name | Date |
|---|---|---|
| 441,126 | Boone | Nov. 25, 1890 |
| 676,348 | Bell | June 11, 1901 |
| 1,013,347 | Wetzel | Jan. 2, 1912 |